United States Patent [19]

West

[11] 4,329,722
[45] May 11, 1982

[54] ENCLOSED DISC DRIVE HAVING COMBINATION FILTER ASSEMBLY

[75] Inventor: Terence H. West, San Jose, Calif.
[73] Assignee: Priam Corporation, San Jose, Calif.
[21] Appl. No.: 150,042
[22] Filed: May 15, 1980
[51] Int. Cl.³ ............... G11B 23/02; G11B 25/04
[52] U.S. Cl. .............................. 360/98; 360/133
[58] Field of Search .............. 360/98, 99, 97, 133, 360/86

[56] References Cited

U.S. PATENT DOCUMENTS

| | | | |
|---|---|---|---|
| 3,723,980 | 3/1973 | Gabor | 360/98 |
| 3,825,951 | 7/1974 | Katsumori et al. | 360/98 |
| 4,008,492 | 2/1977 | Esling | 360/98 |
| 4,130,845 | 12/1978 | Kulma | 360/98 |
| 4,194,225 | 3/1980 | Hasler | 360/98 |
| 4,250,528 | 2/1981 | Oda | 360/98 |

Primary Examiner—Alfred H. Eddleman
Attorney, Agent, or Firm—Flehr, Hohbach, Test

[57] ABSTRACT

A combination filter system for an enclosed disc drive in which a breather filter is provided in a central position in the disc drive cover and a recirculating air filter is concentrically positioned about the breather filter. The recirculating filter includes an annular air deflector whereby air flowing from the periphery of the disc housing is filtered and directed towards the spindle, which is positioned in the central opening of the annular air deflector, thereby establishing continuous flow of filtered air within the housing.

13 Claims, 4 Drawing Figures

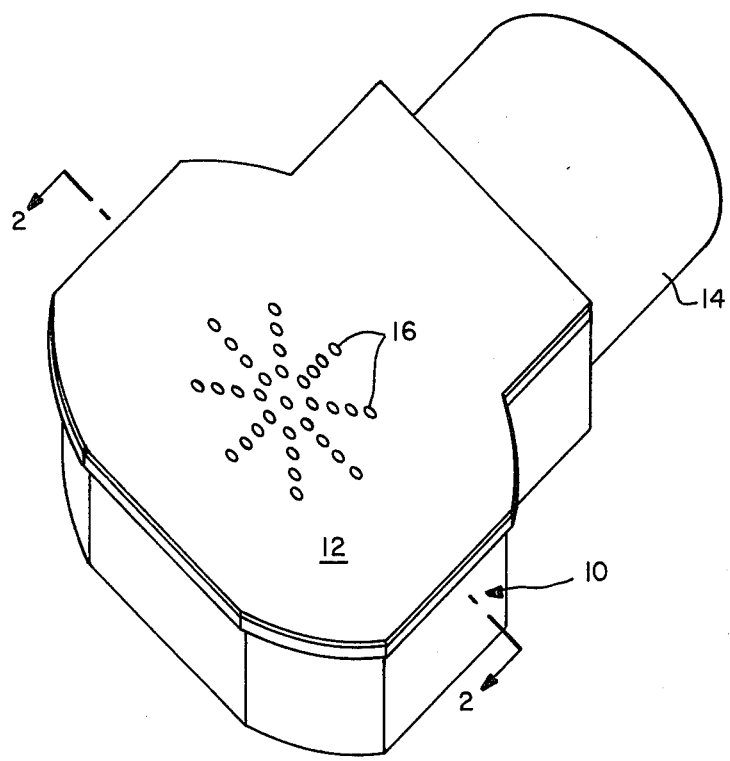
FIG.—1
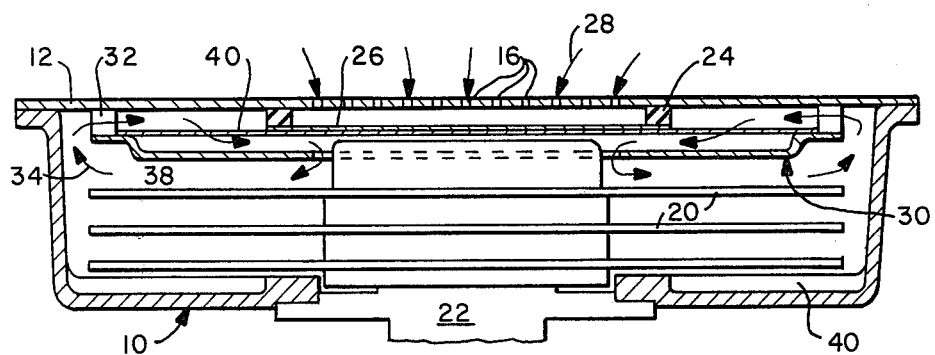
FIG.—2

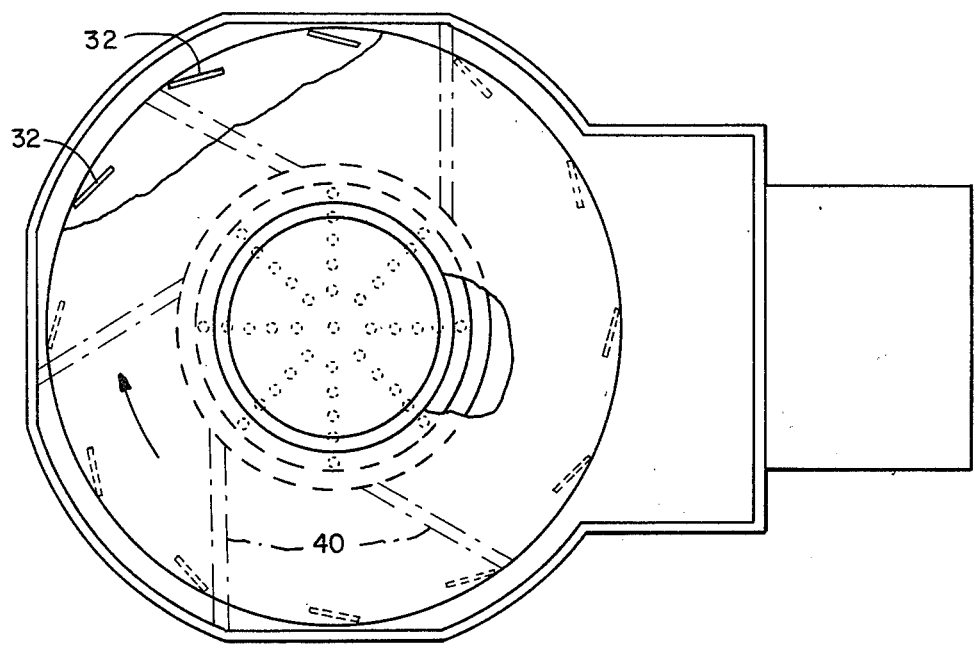
FIG—3
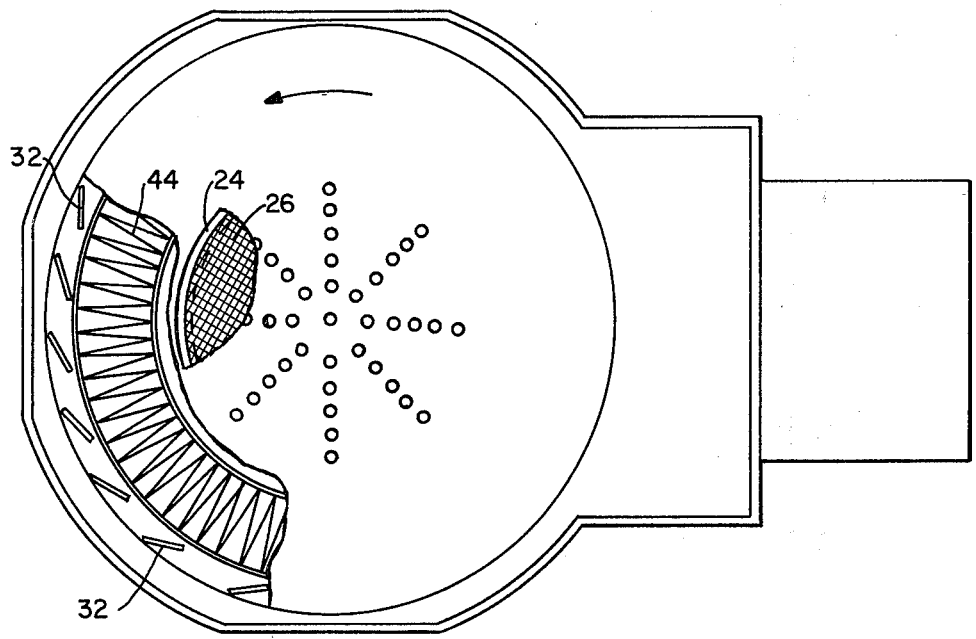
FIG.—4

ENCLOSED DISC DRIVE HAVING COMBINATION FILTER ASSEMBLY

This invention relates generally to magnetic discs for use as memory devices in computer systems, and more particularly the invention relates to sealed magnetic disc drives.

Discs having magnetic coatings on the surfaces thereof provide memories for bits of data which can be randomly accessed at high speed for either retrieving or storing data. Typically heads having small coils are moved across the disc surfaces while the discs are spinning for detecting or storing data in concentric data tracks on the disc surfaces. The discs ride on a thin layer of air created by the spinning disc with the heads being in close proximity to but spaced from the disc surface.

To alleviate problems of contamination and alignment of read/write heads, sealed disc drives have been introduced. These units include read/write heads and carriage, a linear actuator for translating the carriage, a drive motor and spindle, and magnetic discs mounted on the spindle. All of these components are sealed in a housing. Air from outside the sealed housing passes through a breather filter in the housing, and air flow within the sealed housing created by the spindle and disc rotation is filtered by a recirculating air filter. Co-pending application Ser. No. 006,776, filed Jan. 26, 1979, now U.S. Pat. No. 4,282,554, discloses such an enclosed disc drive and integral air filter system.

An object of the present invention is an improved enclosed disc drive and filter system.

Another object of the invention is a filter system for a sealed disc drive which is simple and economical yet effective.

A feature of the invention is a combination filter assembly including a breather air filter and a recirculating air filter.

Briefly, in accordance with the invention an enclosed disc drive includes a container having a bottom portion and a mating top portion, a spindle and drive motor mounted in the bottom portion with the spindle positioned for receiving magnetic disc means, and magnetic disc means mounted on the spindle within the bottom portion and rotatable by the drive motor. A first air filter is centrally positioned in the top portion above the spindle for communicating air between the container and the ambient atmosphere. A second filter is mounted to the inside surface of the top portion and positioned about the first filter, the second filter having an opening near the periphery of the container for receiving air and means for directing filtered air toward the spindle.

The top portion includes a plurality of openings therethrough with an annular spacer attached to the inside surface and surrounding the plurality of openings. A first filter media is attached to the spacer for filtering air passing through the plurality of openings.

An annular air deflector having a central opening is positioned concentrically about the spacer with means provided for attaching the outer periphery of the air deflector to the inside surface of the top portion. A second filter media extends from the spacer to the outer perimeter of the air deflector whereby air flowing from the outer perimeter passes through the second filter media and is directed towards the spindle by the air deflector.

Preferably, the air deflector includes an outer perimeter surface and an inner air deflecting surface which is offset from the outer perimeter surface. The filtered air passing through the second filter media is directed by the air deflecting surface to the spindle which is positioned within the central opening of the annular air deflector.

In accordance with one feature of the invention the means for attaching the outer periphery of the air deflector to the inside surface of the top portion comprises a plurality of vanes for directing air through the second filter media.

The invention and objects and features thereof will be more readily apparent from the following detailed description and appended claims when taken with the drawing, in which:

FIG. 1 is a perspective view of a magnetic disc drive in accordance with one embodiment of the present invention.

FIG. 2 is a side view in section of the disc drive of FIG. 1 taken along the line 2—2.

FIG. 3 is a bottom view of the disc drive of FIG. 1 with portions thereof removed to further illustrate features of the invention.

FIG. 4 is a top view of an alternative embodiment of the disc drive of FIG. 1 with portions thereof removed to illustrate features of the invention.

Referring now to the drawing, FIG. 1 is a perspective view of a disc drive in accordance with one embodiment of the present invention. The disc drive includes a container including a bottom portion 10 and a top portion 12 which enclose a magnetic disc within the container and a drive motor and spindle which are mounted in the bottom portion 10. At one end of the container is a linear motor 14 which linearly translates a pickup head carriage assembly in reading and recording data on the magnetic discs within a container.

The top portion 12 includes a plurality of centrally disposed openings 16 extending therethrough. As shown in the side view in section in FIG. 2 of the disc drive of FIG. 1, the openings 16 communicate air from the ambient atmosphere to the enclosed disc drive. In accordance with the present invention, the top portion 12 includes a first breather air filter for filtering the air passing through the openings 16 and a second recirculating air filter for filtering air which is circulated by the rotation of the discs 20 and spindle 22 within the container.

The breather air filter comprises an annular spacer 24 attached to the inside surface of the top portion 12 and surrounding the plurality of openings 16. A first filter media 26 such as fiberglass cloth is fastened to the annular spacer 24 for filtering the air passing through the opening 16 as indicated by the arrows 28.

The recirculating air filter includes an annular air deflector 30 having a central opening for accommodating the spindle 22. Means such as stand-off 32 attach the outer perimeter of air deflector 30 to the inside surface of top portion 12 whereby air circulating within the container by the spinning discs are directed into the air deflector 30 as indicated by the arrows 34. Preferably, the air deflector 30 includes an inner air deflecting surface 36 which is offset from the outer perimeter surface 38 whereby the circulating air is directed towards spindle 22 thereby establishing continuous flow of filtered air within the housing.

A second filter media 40 such as fiberglas cloth is attached to the outer perimeter surface 38 of the air deflector 30 whereby the air flowing into the air deflector passes through the filter as the air is directed towards the spindle 22. Filter media 40 also functions in cooperation with the filter media 26 as part of the breather filter.

FIG. 3 is a bottom view of the disc drive of FIG. 1 with portions thereof removed to illustrate additional features of the invention. As illustrated, the support stand-offs 32 which support the outer perimeter surface 38 of the air deflector 30 may comprise vanes for directing the circulating air into the air deflector and recirculating air filter. Additionally, in order to increase the air pressure on the bottom surface of the container and thereby insure a positive differential pressure on the spindle and motor seals, a plurality of vanes 40 are provided on the bottom surface to disrupt air flow and thereby decrease the dynamic air pressure and increase static pressure as the magnetic disc and spindle are rotated.

FIG. 4 is a top view of an alternative embodiment of the disc drive of FIG. 1 in which the filter media 44 is positioned upright in an undulating fashion between the air deflector and the inside surface of the top portion. This filter arrangement provides a greater filter surface than the planar filter media sheet 40 of FIG. 2, however the design is more complicated to fabricate.

The disc drive and combination filter assembly in accordance with the present invention has proved to be economical to manufacture and effective in operation. While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. An enclosed disc drive comprising a container including a bottom portion and a mating top portion, a spindle and drive motor mounted in the bottom portion with said spindle positioned for receiving magnetic disc means, magnetic disc means mounted onto the spindle within said bottom portion and rotatable by said drive motor, a first air filter centrally positioned in said top portion above said spindle for communicating air between said container and the ambient atmosphere, a second filter mounted to the inside surface of said top portion above said magnetic disc means and positioned about said first filter, said second filter having an opening near the periphery of said container for receiving air and means for directing filtered air towards said spindle.

2. An enclosed disc drive as defined in claim 1 wherein said top portion includes a plurality of openings therethrough, an annular spacer attached to said inside surface and surrounding said plurality of openings, and first filter media attached to said spacer for filtering air passing through said plurality of openings.

3. An enclosed disc drive as defined by claim 2 and further including an annular air deflector having a central opening, means for attaching the outer perimeter of said air deflector to said inside surface, and second filter media extending from said spacer to said outer perimeter whereby air flowing said outer perimeter passes through said filter media and is directed towards said spindle by said air deflector.

4. An enclosed disc drive as defined by claim 3 wherein said air deflector includes an outer perimeter surface and an inner air deflecting surface which is offset from said outer perimeter surface.

5. An enclosed disc drive as defined by claim 4 wherein said spindle is positioned within said central opening of said annular air deflector.

6. An enclosed disc drive as defined by claim 3 or 5 wherein means for attaching said outer perimeter of said air deflector to said inside surface comprises a plurality of vanes for directing air through said second filter media.

7. An enclosed disc drive as defined by claim 6 wherein said first filter media comprises a first layer of fiberglas filter material and said second filter media comprises a second layer of fiberglas filter material.

8. An enclosed disc drive as defined by claim 6 further including a plurality of vanes on the inside surface of said bottom portion to decrease dynamic air pressure and thereby increase static air pressure as said magnetic disc means is rotated.

9. An enclosure for a magnetic disc drive comprising a bottom housing portion and a top cover for mating said bottom housing portion and sealing a disc therebetween, a first air filter centrally positioned in said top cover for communicating air between said enclosure and the ambient atmosphere, a second filter mounted to the inside surface of said top cover and positioned about said first filter and above a sealed disc, said second filter having an opening near the periphery of said enclosure for receiving air and means for directing filtered air towards the center of said enclosure.

10. An enclosure for magnetic disc as defined by claim 9 wherein said top cover includes a plurality of openings therethrough, an annular spacer attached to said surface and surrounding said plurality of openings, first filter media attached to said spacer for filtering air passing through said plurality of openings, an annular air deflector having a central opening, means for attaching the outer perimeter of said air deflector to said inside surface, and second filter media extending from said spacer to said outer perimeter whereby air flowing said outer perimeter passes through said filter media and is directed towards the center of said enclosure by said air deflector.

11. An enclosure for magnetic disc drive as defined by claim 10 wherein said air deflector includes an outer perimeter surface and an inner air deflecting surface which is offset from said outer perimeter surface.

12. An enclosure for magnetic disc drive as defined by claim 11 wherein said means for attaching said outer perimeter of said air deflector to said inside surface comprises a plurality of vanes for directing air to said second filter media.

13. An enclosure for magnetic disc drive as defined by claim 12 wherein said first filter media comprises a layer of fiberglas filter material and said second filter media comprises a second layer of fiberglas filter material.

* * * * *